(12) United States Patent
Jursik

(10) Patent No.: US 6,681,514 B1
(45) Date of Patent: Jan. 27, 2004

(54) FISHERMAN'S TOOL

(76) Inventor: William J. Jursik, 737 Dempsey Ave., Sebastian, FL (US) 32958

( * ) Notice: Subject to any disclaimer, the term of this patent is extended or adjusted under 35 U.S.C. 154(b) by 0 days.

(21) Appl. No.: 10/308,134

(22) Filed: Dec. 3, 2002

(51) Int. Cl.[7] .............................................. A01K 97/00
(52) U.S. Cl. ............................................. 43/4; 289/17
(58) Field of Search ....................... 43/1, 4, 4.5, 42.53; 269/907; 289/17

(56) References Cited

U.S. PATENT DOCUMENTS

| | | | | |
|---|---|---|---|---|
| 1,210,845 A | * | 1/1917 | Roth | 289/17 |
| 2,716,036 A | * | 8/1955 | Fenell | 289/17 |
| 2,992,029 A | * | 7/1961 | Russell | 289/17 |
| 3,578,035 A | * | 5/1971 | Parker | 140/102.5 |
| 3,700,272 A | * | 10/1972 | Bauer | 289/17 |
| 3,713,680 A | * | 1/1973 | Pagano | 289/17 |
| 3,731,960 A | * | 5/1973 | Pagano | 289/17 |
| 4,336,960 A | * | 6/1982 | Seki | 289/17 |
| 4,400,025 A | * | 8/1983 | Dennison | 289/17 |
| 4,403,797 A | * | 9/1983 | Ragland, Jr. | 289/17 |
| 4,644,677 A | * | 2/1987 | Chureau | 43/4 |
| 4,796,372 A | * | 1/1989 | Klein | 43/4 |
| 5,020,833 A | * | 6/1991 | Wardall | 289/17 |
| 5,240,295 A | | 8/1993 | Spencer | |
| 5,557,874 A | * | 9/1996 | Pietrandrea et al. | 43/4 |
| 6,061,858 A | * | 5/2000 | Shepard | 7/106 |
| 6,260,498 B1 | * | 7/2001 | Cochran | 114/218 |
| 6,305,118 B1 | * | 10/2001 | Wacha | 43/4 |
| 6,322,112 B1 | * | 11/2001 | Duncan | 289/1.5 |
| 6,485,065 B2 | * | 11/2002 | Lusk et al. | 289/1.2 |
| 6,526,690 B2 | * | 3/2003 | Dillard | 43/4 |
| 2002/0069573 A1 | | 6/2002 | Dillard | |

FOREIGN PATENT DOCUMENTS

| | | | |
|---|---|---|---|
| DE | 3213398 | * | 10/1983 |
| GB | 1 564 599 | | 4/1980 |

* cited by examiner

Primary Examiner—Peter M. Poon
Assistant Examiner—David Parsley
(74) Attorney, Agent, or Firm—Richard C. Litman

(57) ABSTRACT

A fisherman's tool in the form a thin elongated aluminum plate with a first L-shaped guide post, an aperture through the plate, and a second L-shaped guide post on the plate adjacent a mid-line between the aperture and the first L-shaped guide post. Wire leader material is passed between the guide posts and looped through the eye of a fishhook or lure and the tag end portion passed through the aperture in the plate. The tool is then rotated around the mid-line to wrap the tag end portion of the wire around the portion of the wire lying between the aperture and second L-shaped post resulting in a barrel wrap securing the fishhook to the wire leader material.

5 Claims, 4 Drawing Sheets

FISHERMAN'S TOOL

BACKGROUND OF THE INVENTION

1. Field of the Invention

The present invention relates generally to fishing, and more particularly to a tool for securing a fishhook or lure to wire leader material.

2. Description of the Related Art

A frequent problem encountered by fishermen of all ages is securing a fishhook to the end of a fishing line. A line of leader material is run through the eye of the fishhook and tied upon; itself so as to form a loop of line joined to the eye of the fishhook and a knot securing the fishhook to the line. This usually requires very close attention and good manual dexterity because there is a constant risk of the fisherman injuring his or her fingers with the barbs of the hook while making the loop and knot.

Devices for tying leader material onto fishhooks in the prior art have taken many forms. For example, U.S. Pat. No. 5,240,295 issued Aug. 31, 1993 to Spencer and British Patent Specification No. 1 564 599 published Apr. 10, 1980 to McClure teach differently constructed knot tying devices that are used to tie monofilament leader lines together. Both devices may also be used to tie monofilament leader line to the eye of a fishhook.

The Spencer and McClure devices, unfortunately, require not only the manipulation of the device, but also the manipulation of the leader line to form the knots which may be both frustrating and time consuming to some users. Both the Spencer and McClure teachings have the disadvantage of requiring the use of a plurality of separate machined component parts, some of which are required to be movable relative to other fixed components parts. This makes, these devices costly to manufacture and assemble.

U.S. patent application Publication Ser. No. US 2002/0069573 A1 of, Dillard published Jun. 13, 2002 teaches a fishhook mount for rigging a fishhook on a wire leader. The mount secures the fishhook in a manner to be rotated about a central axis by a powered hand drill so that a wire leader can be secured to the eye of the fishhook. One purpose of the Dillard device is to reduce injuries associated with securing wire leader material to fishhooks, such as injuries to the fingers caused by barbs on the fishhook or the thin leader wire material. However, the tag end of the wire leader must still be held by hand when the wire leader is being secured onto the fishhook thus a risk of injury from handling the wire leader is still present when using the Dillard device.

None of the above inventions and patents, taken either singularly or in combination, is seen to describe the instant invention as claimed. Thus a fisherman's tool solving the aforementioned problems is desired.

SUMMARY OF THE INVENTION

The present invention provides a tool for use by fishermen to secure a fishhook or lure to wire leader material. The tool is in the form of a thin elongated plate, or more particular a rectangular plates, preferably fabricated of aluminum.

A first L-shaped guide post is formed on the top face of the plate along one side edge thereof and adjacent the mid-line between the ends of the elongated plate. The upper leg of the first L-shaped guide post extends across the mid-line towards a first end of the plate. An aperture is provide through the plate adjacent the second side edge of the plate on the mid-line.

A second L-shaped guide post is formed on the top face of the plate adjacent the mid-line between the aperture and the first L-shaped guide post. The upper leg of the second L-shaped guide post extends across the mid-line towards the second end of the plate.

In use, wire leader material is passed between the guide posts and looped through the eye of a fishhook or lure. The tag end of the wire is then passed through the aperture in the plate and pulled so that the wire encircles a portion of the eye of the fishhook. The tool is rotated around the mid-line to wrap the portion of the wire passed through the aperture around the portion of the wire between the aperture and second L-shaped post resulting in a barrel wrap securing the fishhook to the wire leader material.

Accordingly, it is a principal object of the invention to provide an easily manipulated and uncomplicated fishing tool for all persons, regardless of sex or age.

It is another object of the invention to provide a fisherman's tool for securing a fishhook or lure to wire leader material.

It is a further object of the invention to provide a fisherman's tool that reduces the risks of injury while securing a fishhook or lure to wire leader material.

It is an object of the invention to provide improved elements and arrangements in a fishing tool for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
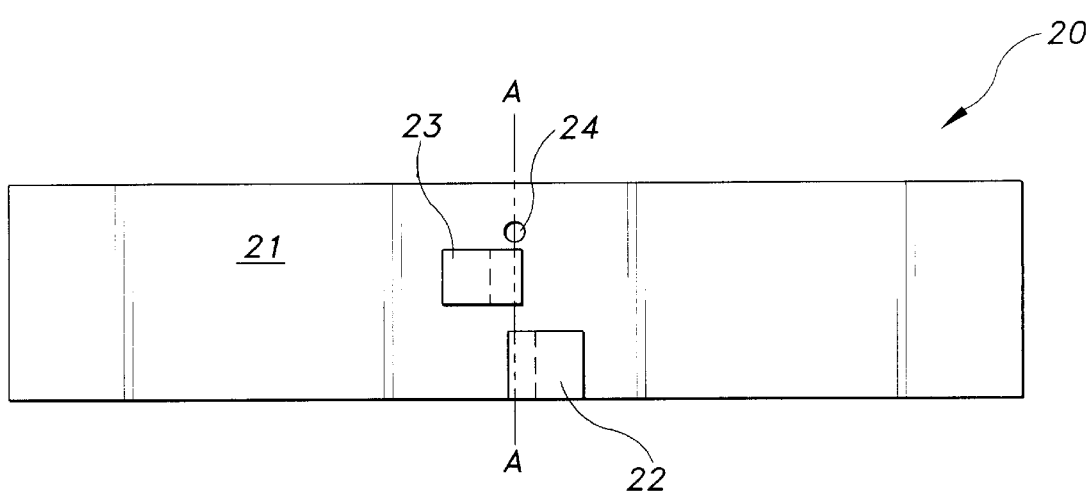
FIG. 2 is a top view of the fisherman's tool according to the, present invention.
Figure 3:
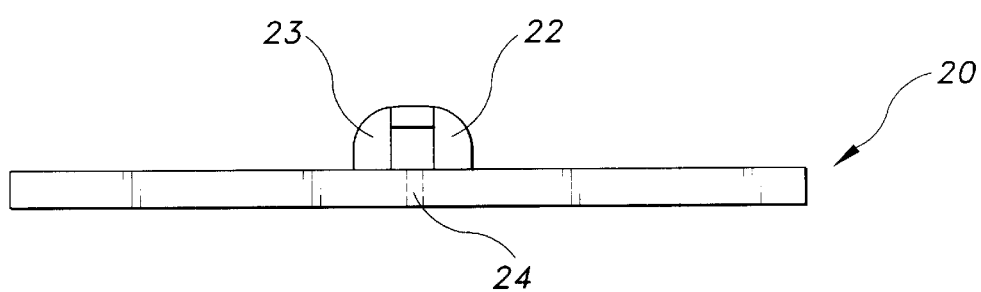
FIG. 3 is a side elevational view of the fisherman's tool according to the present invention.
Figure 4:
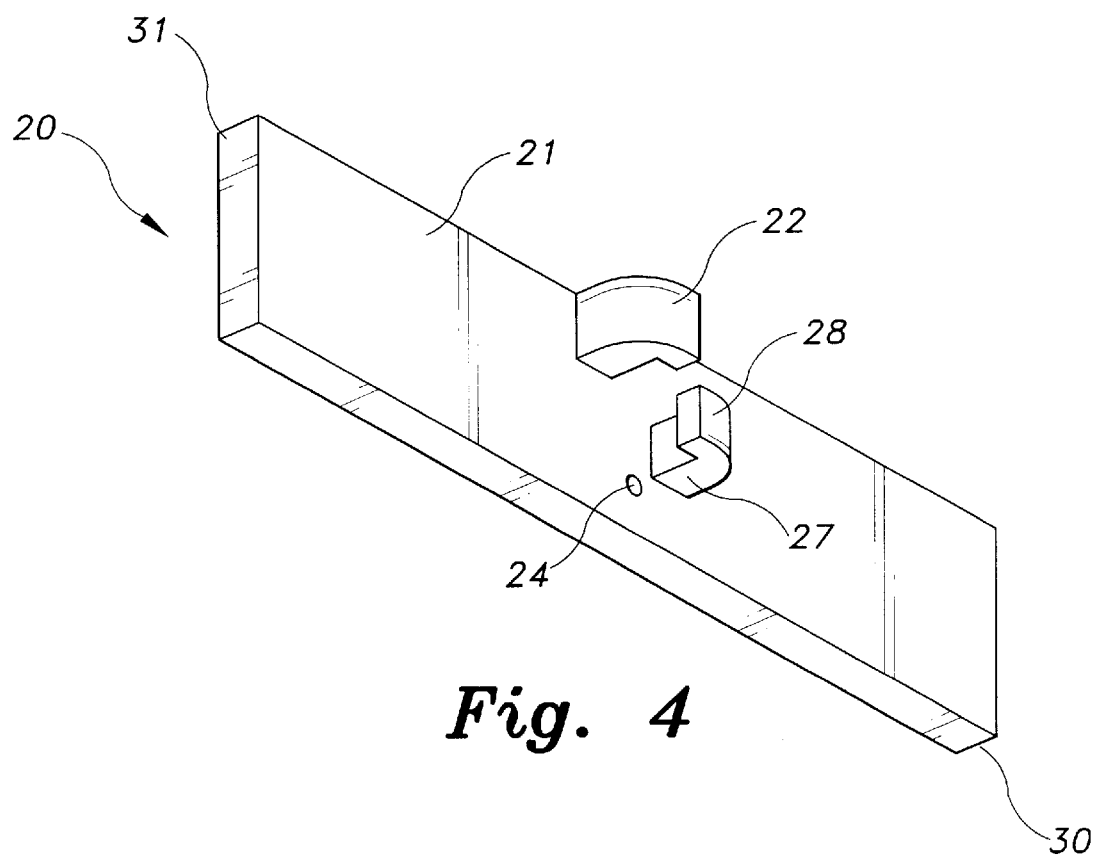
FIG. 4 is a perspective view of the fisherman's tool according: to the present invention.

The invention is a tool for securing a wire leader material to the eye of a fishhook or lure. Referring to FIG. 2, the tool is in the form of a compact aluminum plate 20 sized to fit easily into; the pocket of any garment. The length of the plate 20 is greater than the width. In one preferred embodiment, the plate is 2.0 inches in length and 0.5 inches in width. The plate 20 also includes a first end 30, a second end 31, a first side edge 32, a, second side edge 33, and a top face 21. Two L-shaped guide posts are mounted on the top face 21 of the plate 20 adjacent mid-line A—A between the first end 31 and the second end 32.

The first guide post 22 is positioned such that a lower leg 25 is secured to the plate on one side of the mid-line. The upper leg 26 of the first guide post extends parallel to the top face 21 across the mid-line toward the first end 30 of the plate 20.

The second guide post 23 is spaced away from the first guide post 22 and has a lower leg 27 secured to the plate 20 on the other side of the mid-line from leg 25 of the first guide post 22. The upper leg 28 of the second guide post 23 extends parallel to the top face 21 across the mid-line toward the second end 31 of the plate 20.

The plate 20 further includes an aperture 24 passing through the thickness of the plate adjacent the second side edge 33 and on the mid-line. The aperture 24, first guide post 22, and second guide post 23 are sized and arranged to operatively receive wire leader material in a range of wire gauge sizes. The plate may bet entirely formed by machining or any suitable process.

Figure 1:
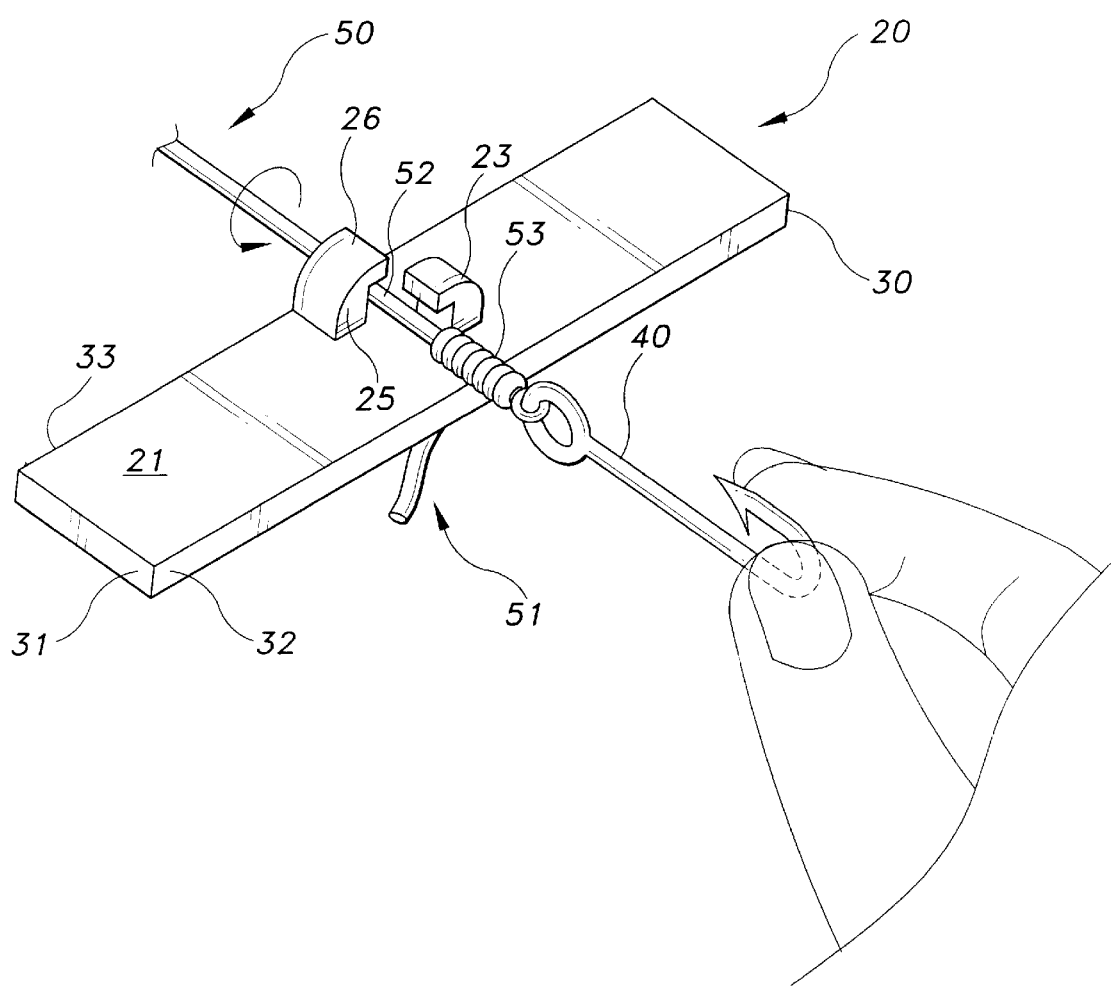
FIG. 1 is an environmental, perspective view of a fisherman's, tool according to the present invention.

The use of the invention is as follows. Referring to FIG. 1, a portion 52 of the wire leader material is guided beneath the upper legs of the first and second guide posts. The tag end portion 51 of the wire 50 is looped through the eye of a fishhook 40 adjacent the second side edge 32 and passed through the aperture 24 leaving a short length of wire leader material extending away from the plate 20. Guide posts 22 and 23 secure the plate 20 onto wire portion 52 for rotation thereabout. When the plate 20 is rotated around wire portion 52 the tag end portion of wire leader material is retracted through the aperture 24 and wrapped around the wire portion 52. Continued rotation of the plate results in the formation of a barrel wrap 53 securing the fishhook 40 to the wire leader material.

It is to be understood that the present invention is not limited to the embodiments described above, but encompasses any and all embodiments within the scope of the following claims.

I claim:

1. A tool for attaching wire leader material to a fishing hook, said tool comprising:

a thin rectangular plate having a first end and an opposite second end defining a length therebetween, a first side edge and an opposite second side edge defining a width therebetween and a top face with a mid-line defined thereon, the a mid-line extending across the width of said plate midway between the first end and the second end, said plate defining an aperture therethrough, the aperture being on the midline adjacent the second side edge, and being located entirely within a perimeter of said plate;

a first L-shaped guide post disposed on the top face of said plate along the first side edge adjacent one side of the mid-line, said first guide post including a first bottom leg and a first top leg, the first bottom leg extending upward from the top face, the first top leg extending parallel to the top face and further extends above and across the mid-line towards the first end of said plate; and a second L-shaped guide post disposed on the top face of said plate adjacent an opposite side of the mid-line between the aperture and said first L-shaped guide post, said second guide post including a second bottom leg and a second top leg, the second bottom leg extending upward from the top face, the second top leg extending parallel to the top face and further extends above and across the mid-line towards the second end of said plate.

2. The tool according to claim 1, wherein said plate is fabricated of aluminum.

3. The tool according to claim 2, wherein said tool is manufactured by machining.

4. The tool according to claim 1, wherein the length of said plate is 2.0 inches and the width is 0.5 inches.

5. The tool according to claim 1, wherein the aperture is sized to receive wire leader material of a predetermined wire gauge size.

* * * * *